Jan. 23, 1951  P. ARBEIT  2,538,956
ELECTRIC GLASS FURNACE
Filed Aug. 18, 1945
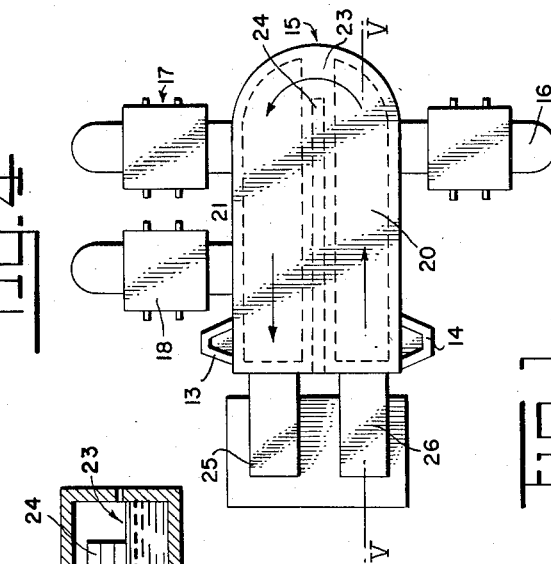
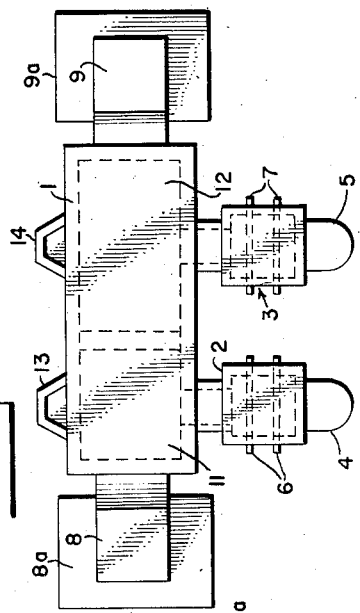
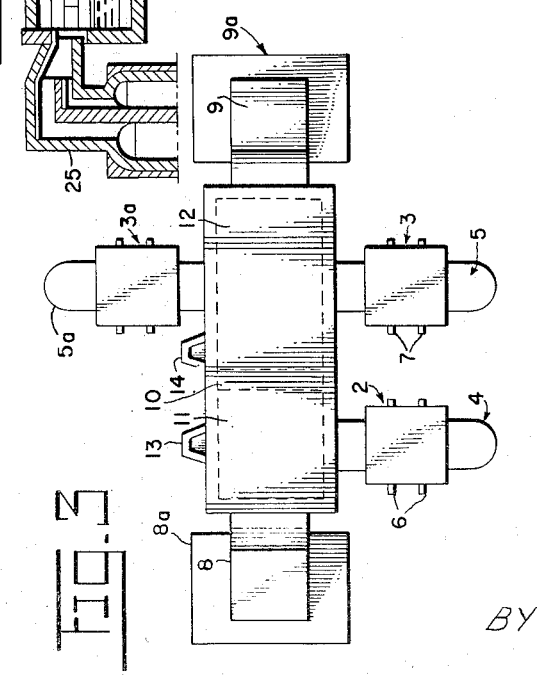
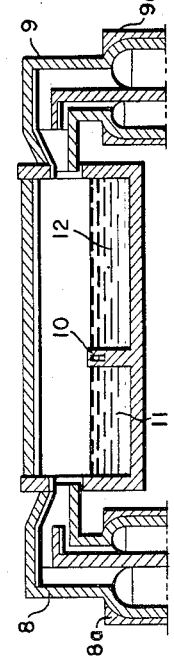
INVENTOR
PIERRE ARBEIT
BY Dale A. Bauer
ATTORNEY

Patented Jan. 23, 1951

2,538,956

UNITED STATES PATENT OFFICE 2,538,956

ELECTRIC GLASS FURNACE

Pierre Arbeit, Paris, France, assignor to Societe Anonyme des Manufactures des Glaces et Produits Chimiques de Saint-Gobain, Chauny & Cirey, Paris, France Application August 18, 1945, Serial No. 611,385
In France January 27, 1944

Section 1, Public Law 690, August 8, 1946
Patent expires January 27, 1964

2 Claims. (Cl. 13—6)

The present invention refers to the glass manufacture and more particularly to the simultaneous production of different kinds of glass from a common melting enclosure.

I am aware that it has been proposed to produce glass in a furnace comprising a melting compartment connected to a refining compartment, the former being heated by means of flame burners, while the second is heated by means of an electric current acting by Joule effect through the glass mass.

Such a combination derives great advantage from the electric energy which is used only for obtaining the high temperatures of refining, while the lower temperatures required for the coarse melting of the glass-making materials are obtained by flame heating which, for those comparatively moderate temperatures, is less expensive than the electric heating.

It has also been disclosed that it is possible to associate with a single melting compartment of the above described type several electrically heated refining compartments or cells fed by said melting compartment. Among other advantages, such an assembly produces different kinds of glass by adding various substances such as, for example, coloring materials to the different refining cells.

My present invention has also for its object a method for the manufacture of glass by using one melting tank connected with several refining cells which are electrically heated by Joule effect.

According to my process, while the glass masses which have to pass from the melting tank into the refining cells are simultaneously melted in a common melting tank, the melting of each of these glass masses is separately effected in distinct compartments of said melting tank separated from each other by means of partitions. In case the melting tank is heated by flames, such partitions really separate the compartments only up to the level of the glass bath, allowing the flames to pass freely over said different compartments.

In conformity with my invention, a part or all the components that differentiate the glasses which are obtained at the outlets of the different refining cells in nature, physical features, or coloration are added to the different compartments of the melting tank or to some of these compartments.

In my process the additions to the refining cells may be omitted or reduced. This avoids a cause of cooling prejudicial to the efficiency of the refining cell and to the quality of the finished product. On the other hand, I have ascertained that, in certain cases, a greater efficiency is obtained when the addition of components is made in the melting tank, that is to say that for the same result the quantities of added materials required are smaller.

When effecting, in conformity with my invention, the melting of those additional materials or of some of them, in the melting tank itself, I have ascertained that the thermic energy spent in the melting tank was not increased in a substantial way.

As to the delimitation of the distinct compartments in the melting tank itself, it must be noted that such arrangement is made possible by the fact that, in my invention, said melting tank is not used for the whole elaboration of the glass and consequently is not subjected to the high refining temperatures, but as said tank is completed by refining cells, it is brought only to a comparatively moderate temperature which is sufficient to produce the melting of the glass-making materials to a pasty state. As a fact such temperature may be not higher than 1300° C. and under those conditions the behaviour of the refractory parts constituting the partitions between the different compartments of the melting tank is greatly facilitated.

It must also be noted that the heating of the melting tank, when effected by flames passing above the glass bath and being in no way hindered or modified by the existence of partitions provided in the bath itself, has a thermal efficiency which is practically not altered by the partitioning.

From that point of view, it will be noted that, while being partitioned and suitable for several simultaneous productions, the tank has large size, thus keeping the thermal advantages of the big melting tanks. Such advantage is found, whatever may be the method for heating the melting tank, for instance when it is heated electrically by induction or by radiation.

Moreover, the fact that the several melting compartments are practically subjected to the same thermal conditions (those produced, for example, by flames), does not cause any difficulty, as might be supposed at first sight, in the elaboration of glasses, having different compositions, located in each of the compartments. The glasses of the different compartments are submitted in the corresponding refining cells to the particular thermal treatment that is desirable for each particular glass. The refining cells are independent of each other, so that the particular treatment suitable for the glass of each melting compartment may easily be effected in the refining cell to which that glass passes.

The different characteristic features and the advantages of my invention will more clearly appear from the description of several embodiments of the invention hereunder given as mere examples.

Fig. 1 is a diagrammatic plan view of a furnace designed in conformity with my invention;

Fig. 2 is a section on line II—II of Fig. 1;

Fig. 3 is a plan view of a modified form of furnace;

Fig. 4 is a plan view of a further modified furnace;

Fig. 5 is a section on line V—V of Fig. 4.

On Fig. 1, the melting tank in shown at 1, and the refining cells (two cells in the considered example) are shown at 2 and 3. 4 and 5 show the working apparatus (feeders for example) and 6 and 7 are the electrodes for supplying the electric current to the glass masses of the cells 2 and 3. 8 and 9 show the flame burners of the tank 1. 8a and 9a show the regenerators corresponding to each of these burners. The communication between each cell and the melting tank may be accomplished through a shallow channel 50, located at the upper level of the glass bath, which affords the advantage of limiting the communication to a shallow layer at the upper part of the bath.

A partition 10 divides said tank into two compartments 11 and 12, the compartment 11 feeding the cell 2 and the compartment 12 feeding the cell 3. The respective surfaces of those two compartments are in proportion to the quantities of glass which are to be supplied to the working apparatus 4 and 5 through the refining cells 2 and 3. In the considered example, the compartment 11 has a smaller area than compartment 12.

If the poduction from the working apparatus 4 requires a certain kind of colored glass, the additions of coloring materials or of glass-making materials corresponding to that kind of glass will be effected in the melting compartment 11. It is possible to operate in the same way for the production of the working apparatus 5, that is to say that other additions may take place in the melting compartment 12. The additions will be accomplished in the forehearths 13 and 14 which are normally used for feeding the glass-making materials to the respective melting compartments 11 and 12.

In some cases the additions may, without any inconvenience, be made directly to the refining cell, or at least, a part of the addition may be so made. Under those conditions several cells, while being destined to supply glasses different from one cell to another, may nevertheless all be fed from one melting compartment.

Fig. 3 relates to a type of furnace corresponding to that particular feature.

To compartment 12 a second cell has been added, the elements of which are numbered 3a and 5a. The glass supplied by the compartment 12 is then, for instance, white or semi-white. In one of the two cells 3 and 3a, an addition, for example, will be made to obtain blue-green glass while, in the other cell, it will be possible either to make no addition if it is desirable to produce white or semi-white articles, or else to make an addition to produce yellow glass.

Figs. 4 and 5 refer to a particular embodiment in which the melting tank is a horse-shoe tank.

In conformity with my invention, the cell 16 for example is fed by a distinct compartment 20 of the melting tank, and the cells 17 and 18 are supplied with glass from another compartment 21 of the same melting tank, said compartment 21 being common to both cells 17 and 18. A partition 23 provided along the longitudinal axis of the tank and slightly emerging above the glass level is surmounted by a small wall 24, placed in the tank above the glass bath, having for its aim to direct the flames from the burners 25 and 26 to the opposed end of the melting tank, thus facilitating the horse shoe movement of that flame.

According to my invention, additions of different substances such as coloring materials or glass constituents themselves may be effected outside the refining cells in the melting compartments 20 and 21.

Though in the hereinabove specification I have only mentioned heating by flames for the melting tank, it must be understood that my invention may be applied to furnaces where the melting is performed with other heating means such as for example electrical heating by radiation, induction, etc. Briefly, the melting tank of the furnace according to my invention may be provided with any heating means which, while being common to all the compartments of said melting tank, are suitable to heat each of said compartments.

What is claimed is:

1. A furnace comprising a plurality of melting chambers side by side including separated glass melting tanks and an enclosure for said tanks including separate flame passages above the tanks which are joined at one end of the enclosure, reversible flame ports opening into said passages at the end of the enclosure opposite the connection between the passages, cells outside the said tanks and enclosure separately connected to the said separate melting chambers by channels limited to the passage of molten glass, and Joule effect electrodes extending into the glass holding part of said external cells.

2. A furnace comprising a plurality of separated glass melting tanks side by side, an enclosure for said tanks including a flame passage above the tanks, heating means for said tanks consisting of flame generators directed into said flame passage, cells outside said tanks and enclosure separately connected to the said separate melting chambers by channels limited to the passage of molten glass, and heating means for each said cell consisting of Joule effect electrodes adapted to extend into the glass thereof.

PIERRE ARBEIT.

REFERENCES CITED

The following references are of record in the file of this patent:

UNITED STATES PATENTS

| Number | Name | Date |
|---|---|---|
| 762,270 | Benjamin | June 14, 1904 |
| 789,911 | Hitchcock | May 16, 1905 |
| 1,594,496 | Clark | Aug. 3, 1926 |
| 1,669,968 | Bunge | May 15, 1928 |
| 1,795,933 | Cripe | Mar. 10, 1931 |
| 1,827,471 | Hitner | Oct. 13, 1931 |
| 1,832,063 | Thompson | Nov. 17, 1931 |
| 1,897,973 | Wadman | Feb. 14, 1933 |
| 1,953,023 | Mulholland | Mar. 27, 1934 |
| 1,970,112 | Wadman | Aug. 14, 1934 |
| 2,106,547 | Canfield | Jan. 25, 1938 |
| 2,115,408 | Brosse | Apr. 26, 1938 |
| 2,254,079 | McAlpine | Aug. 26, 1941 |
| 2,274,643 | Adams | Mar. 3, 1942 |

FOREIGN PATENTS

| Number | Country | Date |
|---|---|---|
| 250,536 | Great Britain | July 29, 1926 |

Certificate of Correction

Patent No. 2,538,956 January 23, 1951

PIERRE ARBEIT

It is hereby certified that error appears in the printed specification of the above numbered patent requiring correction as follows:

Column 3, line 11, for the words "in shown" read *is shown*; line 69, after the word and period "tank." insert the following paragraph: *Fig. 4 shows a flame melting tank 15 associated with three refining cells 16—17—18.*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*